2 Sheets—Sheet 2
U. A. Boyden,
Journal Bearing.
Nº 5,068.
Patented Apr. 17, 1847.
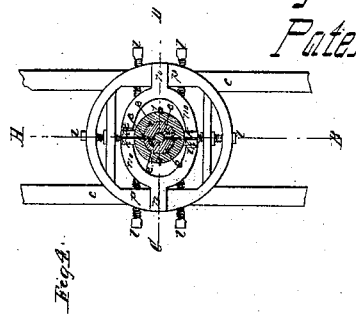
Fig. 4.
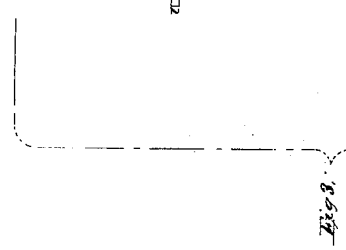
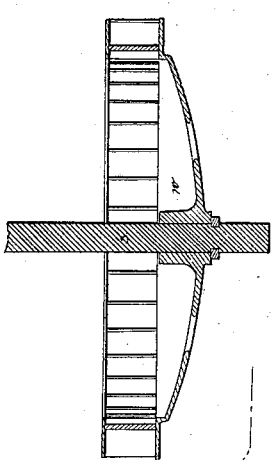
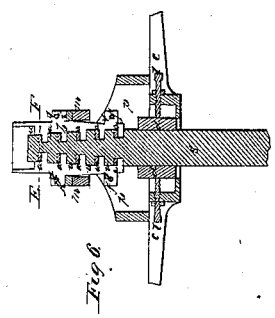
Fig. 3.    Fig. 6.
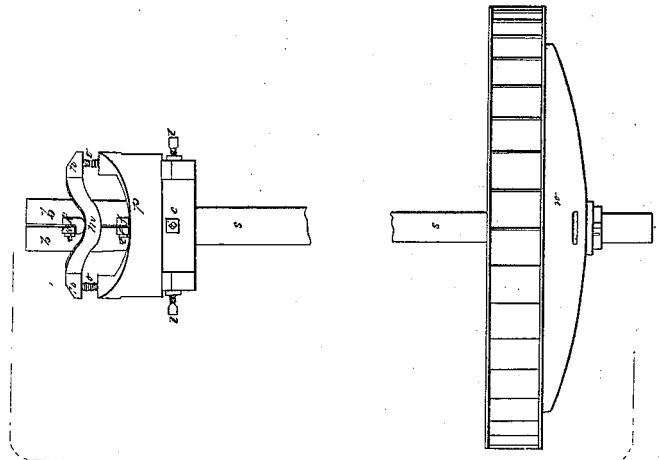
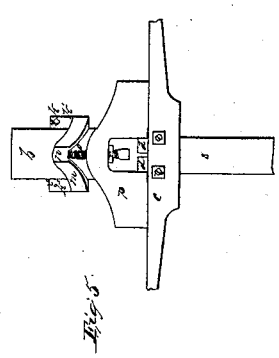
Fig. 2.    Fig. 5.
Witnesses.
Barnabas Whitney
Geo. Clark
Inventor.
Uriah Atherton Boyden
AM. PHOTO-LITHO. CO. N.Y. (OSBORNE'S PROCESS)

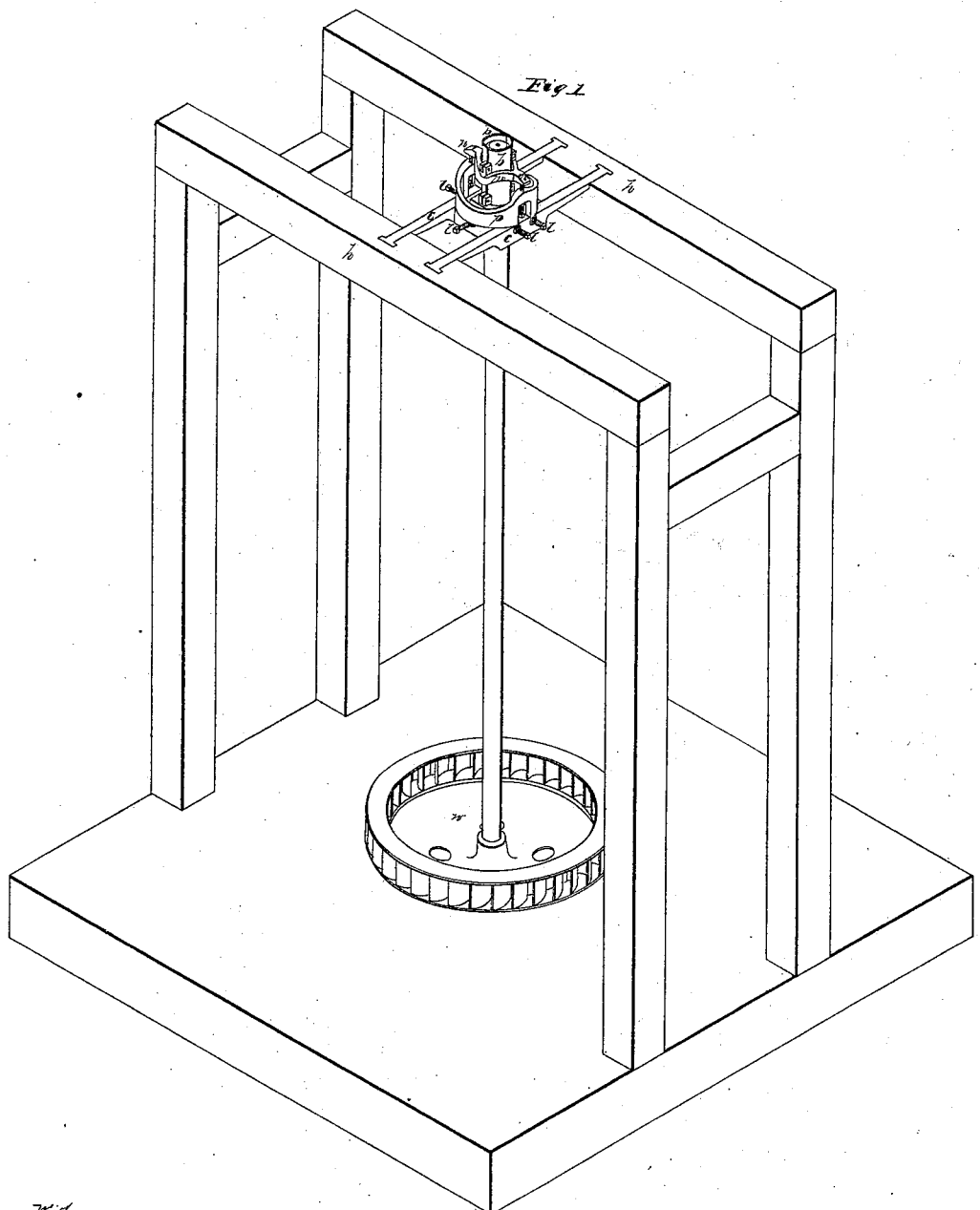

UNITED STATES PATENT OFFICE.

URIAH ATHERTON BOYDEN, OF BOSTON, MASSACHUSETTS.

HANGING SHAFT OF WATER-WHEELS, &c.

Specification of Letters Patent No. 5,068, dated April 17, 1847.

*To all whom it may concern:*

Be it known that I, URIAH ATHERTON BOYDEN, of Boston, in the county of Suffolk and State of Massachusetts, have invented a new and useful Bearing for Sustaining Axles and Wheels, called the "Self-Adjusting Bearing," of which the following is a full and exact description.

The nature of my invention consists in sustaining axles, shafts or spindles, and whatever else may press them downward or longitudinally, by a bearing which can lean or incline freely in every direction so as to adjust itself to any position or inclination of the shaft, and thereby prevent any binding of the bearing; and to secure the resting of the axle on a sufficiently large surface to prevent rapid wearing.

To enable others skilled in the art to make and use my invention, I will proceed to describe its construction and operation, by first referring to the annexed drawings, which make a part of this specification.

Figure 1 is an isometrical projection of the bearing, axle, wheel and frame which supports them; Fig. 2 is an elevation of the bearing, axle and wheel. Fig. 3 is a vertical section of the bearing, axle and wheel, parallel to the elevation, Fig. 2, and through the center of the axle; Fig. 4 is a horizontal section of the axle and bearing, through so near their top, as to show the greater part of the bearing in plan; Fig. 5 is an elevation of the bearing and part of the axle, perpendicular to the elevation, Fig. 2. And Fig. 6 is a vertical section of the bearing and part of the axle, through the center of the axle, and perpendicular to the section Fig. 3. Fig. 1 is on a smaller scale than the other figures.

The same small letters in all the figures, refer to the same parts.

$s$ $s$ is the axle, having the annular projections $u$, $u$, $u$, $u$, $u$, at its top; $w$ is a wheel; $d$, $d$ are two bushes which nearly encompass the axle and support it laterally; the bridge piece $c$ $c$ rests on the frame $h$ $h$, Fig. 1, and sustains the two bushes $d$, $d$, and the self-adjusting bearing also rests on it; the screws $l$, $l$, &c., are turned through the bridge piece $c$ $c$ and serve for adjusting the two bushes $d$, $d$.

$b$, $b$ are two segments of a solid of revolution, each of which has the projections $k$, $k'$, $f$, $f$, and the small parts $e$, $e$, $e$, &c., Fig. 4. The lower part of the projection $k'$ is about twice as thick as its upper part; and the lower surface of the projection $k$, of the other segment, rests on the offset or thick part of the projection $k'$. Each segment has one of its projections $k'$, thick at its lower part, so that the projection $k$ of the other segment, rests on the thick part or offset of $k'$; this keeps the two segments $b$, $b$, opposite each other. The four projections $k$ and $k'$, $k$ and $k'$, form two trunnions or pivots on which the segments $b$, $b$, when fastened together, can hinge or make a part of a revolution, that is, they can lean or incline about an axis which passes through the surfaces of these trunnions which rest on the waved ring $m$ $m$.

$a$, $a$, $a$, &c., Figs. 3, 4 and 6, are alloy confined in the segments $b$, $b$, on which the annular projections $u$, $u$, &c., of the shaft, run; $m$ $m$, is a waved elliptical ring or an elliptical ring of double curvature, which has two projections $n$, $n$; the trunnins $k$ and $k'$, $k$ and $k'$, bear upon and hinge on this ring, and the two projections $n$, $n$ bear upon and hinge on the screws $o$, $o$; the two screws $o$, $o$, are turned through the irregular annular body $p$ $p$, which rest on the bridge piece $c$ $c$, and is movable horizontally on $c$ $c$; $r$, $r$, Figs. 3 and 5, are two nuts which are turned hard against the annular body $p$ $p$, to prevent the screws $o$, $o$, from turning; $t$, $t$, $t$, $t$, are four screws by which the two segments $b$, $b$, are fastened together.

The axle can revolve in the segments $b$, $b$; and as these segments so connected, can incline or hinge on their trunnions or pivots $k$ and $k'$, $k$ and $k'$, and as the elliptical ring $m$ $m$, can incline or hinge on the ends of the two screws $o$, $o$, as pivots, at right angles to the motion of the segments on their trunnions, and as the segments with the waved ring and irregular annular body $p$ $p$, can move laterally by the sliding of the body $p$ $p$, on the bridge piece $c$ $c$, the segments $b$, $b$, when sustained in this way, will move laterally and incline or lean freely in every direction so as to adjust or adapt themselves to every position and inclination of the axle; hence the name, self-adjusting bearing.

The screws $o$, $o$, serve for raising or lowering the axle; and as this bearing has the property of adjusting itself to any inclination of the shaft, there is no danger of causing any binding of the axle, or of producing a greater stress on one of the segments $b$, $b$, than on the other, by turning these screws, or by any unequal settling of the structure which sustains this bearing.

$a$, $a$, &c., are any metal or alloy suitable for enduring the friction of axles. An alloy of one part copper, two antimony and twenty tin, is suitable. And it may be well fixed in the segments by placing the axle horizontally and putting the segments on their places about the axle, one being above and the other below the axle, and pouring the melted alloy into the lower segment; after which the other segment may be turned below the axle, and the alloy poured into it in the same way as in the first; or only one segment need be in contact with the axle when the alloy is poured into the segment, if some other means be taken to insure the segments being so placed when the alloy is poured, that the axle shall rest equally on the alloy in each segment when they are screwed together about the axle, and put in use. Though neither the forming of annular projections on axles, or the forming of surfaces for these projections to run on, by the casting of any metal or alloy about them, is claimed as new, it seemed needful to describe this process minutely.

When the segments are composed of metal which the alloy does not combine with or adhere to, it is well to have projecting parts $e$, $e$, &c., Fig. 4, to hold it; but when the alloy adheres to the segments, these parts $e$, $e$, &c., are not needed. It is well to have the axle and segments of nearly the same temperature when the alloy is poured into the segments and if the axle and segments be iron, and the alloy composed as above, this temperature should not be much below the fusing temperature of the alloy.

It is generally best to have so many annular projections $u$, $u$, $u$, $u$, $u$, on the axle, that there may be much more surface to their lower sides than is sufficient to prevent their crushing or pressing the alloy out of its place by the weight or pressure of the axle, when the whole of the lower surfaces of the annular projections bear upon the alloy. This may be done by only one annular projection of large diameter; but it is better to have several annular projections of small diameter. Supposing the alloy be composed as above mentioned, if there be about as many superficial inches in the lower sides of these annular projections, as there are hundreds of pounds pressure to sustain, it will answer the purpose well. It is well to have the parts about the alloy so shaped that if one of the pieces of alloy sustains too large a portion of the pressure of the axle, it may be crushed and spread a little, and its top thus lowered a little, so as to let the pressure of the axle, be distributed more equally on the several pieces of alloy. It is best that the two segments $b$, $b$, should not quite encompass the shaft, that is, that their two approximating edges on each side of the shaft, should be a little distance apart, to permit oil to flow between them to lubricate the annular projections. If the shaft be 5 inches in diameter, these two side passages may each be about one quarter of an inch wide. The annular projections $u$, $u$, &c., may be well oiled by means of a siphon wick or filter, in contact with the upper surface of the highest annular projection. Tallow or other unctious substance, should be placed in contact with the upper annular projection, within the segments, which will melt and flow on the annular projections, if they become hot while in use. If there be holes through each of the annular projections, so that oil can descend through them, their lower surfaces will be rather more certain to be completely oiled.

It is well to have rings on the screws $t$, $t$, $t$, $t$, between the projecting parts $f$ and $f$, $f$ and $f$, and between the projecting parts $k$ and $k'$, $k$ and $k'$, or to have these projections otherwise so shaped that they may be fastened firmly together by the screws $t$, $t$, $t$, $t$, without pinching or binding the shaft. It is well to have the lower side of the trunnions $k$ and $k'$, $k$ and $k'$, rather above the center of the segments, or rather above the mean height of the surfaces of the alloy on which the shaft turns; and to have the tops of the screws $o$, $o$, rather above the lower side of the trunnions.

It is well to have sockets or depressions in the lower sides of the projecting parts $n$, $n$, for the ends of the screws $o$, $o$, to fit in, to prevent these projecting parts from slipping off these screws; the depth of these depressions may be about half the diameter of the screws, or rather more.

It is well to have the irregular annular body, $p$ $p$, movable horizontally on the bridge piece $c$ $c$, so that the segments $b$, $b$, may not have any considerable lateral pressure against the axle.

I having above described the form of the self adjusting bearing which seems to me as good as any, I will now describe the bearing more generally, having regard to its principles, rather than its form. This bearing consists essentially of three parts, which I will call links. The first link being the segment $b$, $b$, as fastened together, with their trunnons $k$ and $k'$, $k$ and $k'$, the projectons $f$, $f$, $f$, $f$, the four screws which pass through the trunnions and projections $f$, $f$, $f$, $f$, to fasten the segments together, and the alloy in the segments on which the annular projections of the shaft turn, and the projections $e$, $e$, &c., which hold the alloy. The second link consists of the elliptical ring of double curvature $m$ $m$, with its projections $n$, $n$. The third link consists of the irregular annular body p p, the two secrews o, o, and the two nuts r, r. The first link can hinge or make part of a revolution on the second link; and the second link can hinge or make part of a revolution on the third link; the axis on which the second link hinges being perpendicular to the axis on which the first link hinges, or these two axes differ considerable from parallelism, or they have not the same direction. And the third link may slide or move laterally on whatever it rests upon. But the sliding laterally of the third link on what it rests upon, may be dispensed with, and the sliding may take place between the first and second links, or between the second and third links, or at both places. Or there may be no sliding or moving laterally of any of the links, if it be intended that the bearing shall resist lateral pressure.

These being the properties of the bearing, it is evident that a variety of modifications of the form shown by the drawings, may answer the purpose. Thus, the upper parts of the first link, which are designed to hold tallow, may be dispensed with. Or the parts of the first link may completely encompass the annular projections so as to close the two side passages for oil, and the projections be oiled in some other way; for instance, by means of cylindrical holes from the top or convex sides of the link, to the projections. This link may be fitted to the annular projection, or annular projections, without the casting of any metal or alloy about the projection or projections. The screws t, t, &c., may be dispensed with, and the parts of this link kept together by a variety of other means; for instance, the projections k and k', k and k', may be of equal width and thickness and fitted into grooves in the second link. Instead of there being just two segments in this link to encompass, or nearly encompass the annular projections, there may be a different number. The second link, instead of having the form of an elliptical ring of double cuvature with projections n, n, may have a variety of other forms; for instance, it may be a plain circular ring, or it may be square; or it may have two projections for the first link to bear upon, the trunnions of the first link being dispensed with. The third link, instead of being annular, may have a variety of other forms; for instance, it may be square; or the two screws o, o, may be dispensed with.

Instead of having the two screws o, o, in the third link, they may be in either of the other links. Instead of the third link being movable laterally on whatever supports it, to allow the first link to adjust or adapt itself laterally to the shaft; the first and second links may be so shaped that one can slide or move laterally on the other; or the second and third links may be so shaped that the second can slide or move laterally on the third link; or the whole three may be so shaped that the sliding may take place between the first and second links in one direction, and the sliding between the second and third links, in some other direction, as at right angles. The third link may be fixed or may be adjustable laterally by screws or other means, so that the first link can resist lateral pressure, if the first and second links, and the second and third links, be so formed that one cannot slide or move laterally on another. It will also readily be perceived, that the constituent parts of the second link, as above described, may be repeated, and the character and operation of the bearing still remain the same.

What I claim as my invention, and desire to secure by Letters Patent, is—

The method of sustaining axles, shafts and spindles, and whatever else may press them downward or longitudinally, by means of the self adjusting bearing, consisting of the first, second and third links, as above described; whether the third link be movable or adjustable laterally on or in respect to whatever it rests upon or not; and whether the first link be movable or adjustable laterally on or in respect to the second links or not; and whether the second link be movable or adjustable laterally on or in respect to the third link or not.

I do not confine my claim precisely to the forms described above, but I extend it to all forms which are essentially the same in character, principle and operation.

URIAH ATHERTON BOYDEN.

Witnesses:
 CALVIN BROWN,
 AUGUSTUS LORD HAVEN.